(12) United States Patent
Kim et al.

(10) Patent No.: US 6,315,222 B1
(45) Date of Patent: Nov. 13, 2001

(54) METHOD OF PRODUCING PASTE CONTAINING FLAKY ALUMINUM POWDER

(75) Inventors: Byoung-Kee Kim; Seong-Hyeon Hong; Dong-Won Lee, all of Kyungnam (KR)

(73) Assignee: Korea Institute of Machinery and Materials, Kyungnam (KR)

( * ) Notice: Subject to any disclaimer, the term of this patent is extended or adjusted under 35 U.S.C. 154(b) by 0 days.

(21) Appl. No.: 09/468,125

(22) Filed: Dec. 21, 1999

(30) Foreign Application Priority Data

Jun. 23, 1999 (KR) .................................................. 99-23789

(51) Int. Cl.$^7$ .................................................. B02C 19/12
(52) U.S. Cl. .............................. 241/21; 241/30; 241/184
(58) Field of Search .................................. 241/30, 184, 21

(56) References Cited

U.S. PATENT DOCUMENTS 4,292,087 * 9/1981 Bell .
4,436,809 * 3/1984 Akao et al. .
5,082,744 * 1/1992 Akao et al. .

* cited by examiner

Primary Examiner—Mark Rosenbaum
(74) Attorney, Agent, or Firm—Lowe Hauptman Gilman & Berner, LLP

(57) ABSTRACT

The present invention relates to a method of producing paste containing flaky aluminum powder, which is the main ingredient of the topcoat paint for automobiles. The present invention is intended to provide a production method, which is more economical than the conventional method of using the gas-atomozied powders. In particular, a vessel is charged with by-product scraps from the production process of aluminum foil, balls, mineral spirits, and an unsaturated fatty acid, such as oleic acid. Under such conditions, the ball-milling is carried out to yield an intermediate paste containing flaky aluminum powder, which is then made into aluminum paste by adjusting the amount of a solvent.

6 Claims, 3 Drawing Sheets

| Specimen No. | Type of Scraps (initial thickness of the foil, milling time) | Average Particle Size (μm) | Water-covering Area (cm²/g) | External Appearance after Painting |
|---|---|---|---|---|
| 1 | 6.5 μm, 15 hours | 20 | 18,236 | Good |
| 2 | 6.5 μm, 30 hours | 15 | 24,864 | Good |
| 3 | 6.5 μm, 45 hours | 9 | 26,749 | Good |
| 4 | 6.5 μm, 60 hours | 7 | 28,228 | Good but dark |
| 5 | 16 μm, 15 hours | Foil is not milled | Not measured | Impossible to paint |
| 6 | 16 μm, 30 hours | 25 | 11,920 | Good |
| 7 | 16 μm, 45 hours | 16 | 13,289 | Good |
| 8 | 16 μm, 60 hours | 13 | 21,872 | Good |
| 9 | 60 μm, 15 hours | Foil is not milled | Not measured | Impossible to paint |
| 10 | 60 μm, 30 hours | 107 | 3,384 | Impossible to paint |
| 11 | 60 μm, 45 hours | 20 | 14,950 | Good |
| 12 | 60 μm, 60 hours | 12 | 17,506 | Good |
| 13 | 120 μm, 15 hours | Foil is not milled | Not Measured | Impossible to Paint |
| 14 | 120 μm, 30 hours | Foil is not milled | Not Measured | Impossible to Paint |
| 15 | 120 μm, 45 hours | Foil is not milled | Not Measured | Impossible to Paint |
| 16 | 120 μm, 60 hours | Foil is not milled | Not Measured | Impossible to Paint |

Fig. 1

| Specimen No. | Type of Scraps (initial thickness of the foil, milling time) | Average Particle Size ($\mu m$) | Water-covering Area ($cm^2/g$) | External Appearance after Painting |
|---|---|---|---|---|
| 1 | 6.5 $\mu m$, 15 hours | 20 | 18,236 | Good |
| 2 | 6.5 $\mu m$, 30 hours | 15 | 24,864 | Good |
| 3 | 6.5 $\mu m$, 45 hours | 9 | 26,749 | Good |
| 4 | 6.5 $\mu m$, 60 hours | 7 | 28,228 | Good but dark |
| 5 | 16 $\mu m$, 15 hours | Foil is not milled | Not measured | Impossible to paint |
| 6 | 16 $\mu m$, 30 hours | 25 | 11,920 | Good |
| 7 | 16 $\mu m$, 45 hours | 16 | 13,289 | Good |
| 8 | 16 $\mu m$, 60 hours | 13 | 21,872 | Good |
| 9 | 60 $\mu m$, 15 hours | Foil is not milled | Not measured | Impossible to paint |
| 10 | 60 $\mu m$, 30 hours | 107 | 3,384 | Impossible to paint |
| 11 | 60 $\mu m$, 45 hours | 20 | 14,950 | Good |
| 12 | 60 $\mu m$, 60 hours | 12 | 17,506 | Good |
| 13 | 120 $\mu m$, 15 hours | Foil is not milled | Not Measured | Impossible to Paint |
| 14 | 120 $\mu m$, 30 hours | Foil is not milled | Not Measured | Impossible to Paint |
| 15 | 120 $\mu m$, 45 hours | Foil is not milled | Not Measured | Impossible to Paint |
| 16 | 120 $\mu m$, 60 hours | Foil is not milled | Not Measured | Impossible to Paint |

Fig. 2

| Specimen No. | Type of Particle (initial particle size, milling time) | Average Particle Size($\mu$m) | Water-covering Area(cm$^2$/g) | External Appearance after Painting |
|---|---|---|---|---|
| 17 | -325mesh, 15hours | 55 | 18,189 | Good |
| 18 | -325mesh, 30hours | 27 | 15,838 | Good |
| 19 | -325mesh, 45hours | 18 | 17,409 | Good |
| 20 | -325mesh, 60hours | 12 | 17,300 | Good |

Fig. 3

| Specimen No. | Amount of Oleic Acid (%) | Average Particle Size ($\mu$m) | Water-covering area ($cm^2/g$) | External Appearance after Painting |
|---|---|---|---|---|
| 21 | 0 | Foil is not milled | Not measured | Impossible to paint |
| 22 | 1.5 | 21 | 1,000 | Good |
| 23 | 3 | 19 | 24,587 | Good |
| 24 | 5 | 4 | 23,333 | Good but very dark |

METHOD OF PRODUCING PASTE CONTAINING FLAKY ALUMINUM POWDER

TECHNICAL FIELD

This invention relates to a method of producing paste containing flaky aluminum powder.

BACKGROUND OF THE INVENTION

The topcoat paint for automobiles comprises aluminum paste, a hydrocarbon based solvent such as xylene, a hardener, etc. When the paint at a thickness of approximately 40 μm is applied to the surface of the body of an automobile, the aluminum flaky powder having a large water-covering area (approximately half of its specific surface area) becomes evenly distributed within the paint layer. As such, not only does it maintain appropriate luster, but it also serves to protect the coating layer on the surface of the body of an automobile by sealing off the outside air. At that time, however, if the average particle size of flaky aluminum powder is 40 μm or larger, the powder protrudes out of the painting layer, resulting in poor external appearance, and fails to serve as a protective layer. If the average particle size is 10 μm or less, the external appearance after painting appears dark, and thus it is not preferable. Consequently, the average particle size of flaky aluminum powder for automobiles should be 10 μm to 40 μm. At the same time, it should have a water-covering area of 5,000cm$^2$/g or larger, and the aluminum flaky powder should be non-leafing in the solvent.

The conventional method of producing aluminum paste for topcoat of automobiles comprises as follows: placing the gas-atomized powders, balls, mineral spirits, etc. in a vessel; ball-milling the same to obtain an intermediate paste containing flaky aluminum powder; vacuum-drying or filtering the same, followed by adjusting the amount of solvent to obtain the final product of aluminum paste containing over 60 wt % of aluminum powder. The above conventional method of utilizing the gas-atomized powders, however, requires a melting furnace, a high-pressure gas system, a large chamber, and a sieving system. In addition, at the time of melting aluminum, a large supply of electricity is required, which in turn translates into high investment costs along with high production costs for the powder.

SUMMARY OF THE INVENTION

In line with solving the aforementioned problems, the objective of the present invention is to provide a method of producing paste containing flaky aluminum at a relatively low cost by means of cutting the thin and long scraps, obtained as by-products from the production process of aluminum foil, and using it as a starting raw material for ball-milling.

To achieve the aforementioned objectives, the invention provides a method of producing the final product of paste for automobiles. The method is performed with the use of a ball-milling vessel having a milling ball with a known diameter and comprises: (i) charging the vessel with scraps cut to a size smaller than the diameter of the ball in the milling vessel from long and thin aluminum foil of less than or equal to about 80 μm in thickness; balls to mill and induce the same into flaky particles; mineral spirits such as a hydrocarbon-based solvent to prevent oxidation during the milling process; and an unsaturated fatty acid, e.g., oleic acid, to facilitate milling of the scraps, to cause uniform dispersion of aluminum powder in a hydrocarbon-based solvent, and to enhance the efficiency of the milling process; (ii) ball-milling the same to obtain an intermediate paste containing aluminum flaky powder; (iii) vacuum-drying or filtering the same; and (iv) adjusting the amount of the solvent. Preferably, the ball-milling vessel is charged with the unsaturated fatty acid after it has been charged with the aluminum scrap, balls and mineral spirits.

If the thickness of the foil scrap is more than about 80 μm, it is impossible to mill the scrap into powders even after milling for 45 hours or more. In the case of less than or equal to about 80 μm in foil thickness, as the thickness of the foil decreases, it can be milled into powders in a shorter period of time. As such, it is possible to produce fine powder with a large water-covering area. Further, since the foil scrap can be generally made into about 4 μm or more in thickness, it is appropriate to use the foil with about 4–80 μm in thickness as raw material.

Meanwhile, depending on the thickness of the foil scrap, the milling time for producing flaky powder and paste can vary.

When the milling is carried out onto the foil of 4–15 μm in thickness for six hours or less, the average size of the powder so obtained is 40 μm or more, which is inadequate for use as aluminum paste for automobiles. If the milling is carried out for more than 45 hours, it is also inadequate since the particle size of the powder falls to 10 μm or less, which is too small, and consequently it appears dark in color after painting. Therefore, it is appropriate to carry out the milling for 6–45 hours.

If the ball-milling is carried out onto the foil of 16~80 μm in thickness for 40 hours or less, the average size of powder becomes 40 μm or more. If the ball-milling is carried out for 70 hours or more, the average particle size thereof becomes 10 μm or less. Therefore, it is appropriate to carry out the milling for 40~70 hours.

Further, if the charged amount of the balls falls below the level of 25 vol % of the volume of the vessel, it is not easy to mill the scraps into powders. At the level of 60 vol %, the charge amount is too small to be economical. Therefore, it is appropriate to charge the balls in the vessel at 25~60 vol %.

Further, if the charge amount of mineral spirits is 50 wt % or less of that of the scrap, the lubrication action by the added oleic acid is too high to cause a serious slippery phenomenon of the scraps between the balls. As such, it is impossible to mill the scraps into flaky powder of less than 40 μm in average particle size. If it is more than 600 wt %, it takes too long at the time of drying.

Hence, as for the hydrocarbon-based solvent, e.g., mineral spirits, it is appropriate to use 50~600 wt % of the weight of the charged scrap.

In addition, as for the unsaturated fatty acid such as oleic acid used as an additive at the time of ball-milling, it is appropriate to use 1.0~4.5 wt % of the powder obtained at the time of drying. If 1.0 wt % or less is added thereto, it is not easy to mill the scrap even with the extended milling time. Also, it is not easy to maintain the average size of the powder at 40 μm or less. If 4.5 wt % or more is added thereto, the scrap is milled into fine powder of 10 μm or less, and the degree of luster of the coating layer becomes deteriorated.

After the ball-milling process, the amount of solvent is reduced by vacuum-drying the paste or placing the same under pressure via filter-press. Then, when the solvent is added again, the weight of the aluminum powder in the paste is adjusted to 60 wt % or more in order to produce the aluminum paste for the topcoat of automobiles.

BRIEF DESCRIPTION OF THE DRAWINGS

FIG. 1 is table to show the specific results of the experiments (particle size, water-covering area, and external appearance) according to the method of producing the paste containing flaky aluminum powder under the present invention.

FIG. 2 is a table to show the specific results of the experiments (particle size, water-covering area, and external appearance) according to the method of producing the paste containing flaky aluminum powder by milling of gas-atomized FIG. 3 is a table to show the results of the experiments (particle size, water-covering area, and external appearance), according to the amounts of oleic acid, based on the method of producing the paste containing flaky aluminum powder under the present invention.

DETAILED DESCRIPTION OF THE PREFERRED EMBODIMENTS

Below, the preferred embodiment according to the present invention is described in detail with reference to accompanying drawings.

The purity of the aluminum foil used in the experiments was 99.3%, and four types of foils were prepared in varying thickness, e.g., 6.5 $\mu$m, 16 $\mu$m, 60 $\mu$m, and 120 $\mu$m. The foil was cut into long and narrow scraps of about 10 mm×170 mm. The cut scraps were fed into a rotary cutter and were further cut into scraps of about 4 mm in length. The scraps so obtained were then used as starting raw materials for ball-milling.

The vessel for ball-milling was of a cylindrical type, a stainless steel (SUS304) of 80 mm in length and 70 mm in inner diameter with the internal capacity of 307 cc.

The vessel was charged with the following materials: 10 g of aluminum foil scrap, 725 g of stainless steel balls of 16 mm in diameter, 10 g of mineral spirits (100% of the weight of the charged foil scrap), and 0.3 g of oleic acid. The vessel was rotated at 120 rpm for milling for a maximum of 60 hours. And, the mixture was vacuum-dried. Then, 3.5 g of mineral spirits was added thereto and stirred, after which the aluminum paste was obtained.

After milling for a certain period of time, a small quantity (1 g) of the powder was collected, and the particle size and the water-covering area thereof were measured by using the particle size analyzer (Coulter LS 130) and the KS N-5604-1996 standards respectively. In other words, to 0.03 g of the powder washed with acetone three times and dried, 1.5 ml of isobutyl alcohol was added for coating. Then, a rectangular aluminum box of interior measurement of 200 mm×500 mm×20 mm was filled with water, and the powder was dripped onto the water. It was stirred until the aluminum powder was evenly afloat over the surface of the water, and the area covered per gram of aluminum was measured.

Further, after mixing and stirring 0.0846 g of the aluminum paste and 0.54 g of thinner, 1.62 g of lacquer (for the topcoat of iron or metal materials) was added thereto, and the mixture was supersonically agitated and then stirred. As such, the paint for the purpose of measurement (for observing the external appearance) was obtained. After dripping the paint onto the glass plate or steel plate, a bar-coater (#44, stainless steel) was used for rolling with appropriate force, and then the external appearance was observed after painting.

The results (particle size, water-covering area, external appearance) of the production method of the present invention by using the aforementioned experiment conditions are shown in FIG. 1. For the sake of comparison, the examples of the conventional cases of ball-milling the powder obtained by gas atomization are shown in FIG. 2.

In the case of the conventional gas-atomized method, the experiment conditions were the same as those of the present invention using scraps, except for the use of the powder of −325 mesh in size as raw material for ball-milling.

As shown in Specimens 1~4, with respect to the foil scrap of 6.5 $\mu$m in thickness, good results were obtained for 15, 30, and 45 hours.

Specimens 17~20 were the results of the conventional cases of ball-milling the powder of −325 mesh in size from gas atomization. As compared to the case of ball-milling the foil of 6.5 $\mu$m in thickness, it took longer time to obtain the powder of the same average particle size. Even if the similar average particle size were to be obtained, it could be shown that the water-covering area (or specific surface area) was reduced.

As shown in Specimens 5~8, for milling for less than 15 hours by means of using the scrap of 16 $\mu$m, the powderization could not be carried out. Yet, milling for 30, 45 or 60 hours showed relatively good results.

In Specimens 9~12, good results were shown for the 60 $\mu$m-thick foil scrap by ball-milling the same for 45 or 60 hours. At 30 hours, the powder of an average size of 40 $\mu$m or less could not be obtained. Particularly, it was impossible to use the product for automobiles since the 60 $\mu$m-thick foil was not changed into powders by milling for 15 hours.

In Specimens 13~16, if the foil thickness was 120 $\mu$m, the powderization could not be achieved even after 60 hours of ball-milling.

FIG. 3 shows the results of experiments according to the varying amounts of added oleic acid. As shown in Specimens 21~24, it was impossible to mill the foil without adding oleic acid. If more than 4.5 wt % of the weight of the powder was added, the milled powder became too fine, which tended to cause darkening of the surface after painting.

The present invention relates to a method of producing paste containing flaky powder by means of the ball-milling method of aluminum foil, wherein said flaky powder paste for automobiles could be obtained at a lower cost than that of the conventional method of using the gas-atomized powder as a raw material. Furthermore, by re-cycling the by-product scraps coming out from the manufacturing process of aluminum foil, the effect of the present invention is quite substantial from the point of view of environmental protection.

What is claimed is:

1. A method of producing paste containing flaky aluminum powder with the use of a ball-milling vessel having a milling ball with a known diameter which method comprises the steps of:

(a) cutting aluminum foil to scraps having a thickness no greater than about 80 $\mu$m and a length smaller than the diameter of the ball in the milling vessel;

(b) charging in the ball-milling vessel said cut aluminum foil scraps, balls, mineral spirits having a weight in the range of about 50 percent to 600 percent of the weight of the charged aluminum scraps, and an unsaturated fatty acid including oleic acid having a weight in the range of about 1 percent to 4.5 percent of the weight of the charged aluminum scraps;

(c) controlling the amount of the mineral spirits charged in the vessel to control the final paste product containing flaky aluminum powder;

(d) producing an intermediate paste containing flaky aluminum powder by ball-milling the ingredients in the ball-milling vessel; and (e) vacuum-drying or filtering said intermediate paste for about 6 to 45 hours for scraps having a thickness of less than about 16 μm and for about 40 to 70 hours for the scraps having a thickness in the range of about 16 μm to 80 μm.

2. The method of claim 1 wherein the weight of the aluminum powder in said paste is at least about 60 percent of the weight of the paste.

3. A method of producing paste containing flaky aluminum powder with the use of a ball-milling vessel having a milling ball with a known diameter and with aluminum foil pieces having a thickness no greater than about 16 μm and a length smaller than the diameter of the ball in the milling vessel which method comprises the steps of:

(a) charging in the ball-milling vessel said aluminum foil pieces, balls, mineral spirits having a weight in the range of about 50 percent to 600 percent of the weight of the charged aluminum pieces, and an unsaturated fatty acid including oleic acid having a weight in the range of about 1 percent to 4.5 percent of the weight of the charged aluminum pieces, the amount of the mineral spirits charged in the vessel controlling the final paste product containing flaky aluminum powder;

(b) producing an intermediate paste containing flaky aluminum powder by ball-milling the ingredients in the ball-milling vessel; and (c) vacuum-drying or filtering said intermediate paste for about 6 to 45 hours.

4. The method of claim 3 wherein the weight of the aluminum powder in said paste is at least about 60 percent of the weight of the paste.

5. A method of producing paste containing flaky aluminum powder with the use of a ball-milling vessel having a milling ball with a known diameter and with aluminum foil pieces having a thickness in the range of about 16 μm to about 80 μm and a length smaller than the diameter of the ball in the milling vessel which method comprises the steps of:

(a) charging in the ball-milling vessel said aluminum foil pieces, balls, mineral spirits having a weight in the range of about 50 percent to 600 percent of the weight of the charged aluminum pieces, and an unsaturated fatty acid including oleic acid having a weight in the range of about 1 percent to 4.5 percent of the weight of the charged aluminum pieces, the amount of the mineral spirits charged in the vessel controlling the final paste product containing flaky aluminum powder;

(b) producing an intermediate paste containing flaky aluminum powder by ball-milling the ingredients in the ball-milling vessel; and (c) vacuum-drying or filtering said intermediate paste for about 40 to 70 hours for the scraps having a thickness in the range of about 16 μm to 80 μm.

6. The method of claim 5 wherein the weight of the aluminum powder in said paste is at least about 60 percent of the weight of the paste.

* * * * *